United States Patent
Zhang et al.

(10) Patent No.: US 9,445,402 B2
(45) Date of Patent: Sep. 13, 2016

(54) METHOD AND APPARATUS FOR TRANSMITTING CONTROL SIGNALING

(71) Applicant: FUJITSU LIMITED, Kawasaki-shi, Kanagawa (JP)

(72) Inventors: Yuantao Zhang, Beijing (CN); Yi Wang, Beijing (CN); Yi Zhang, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 69 days.

(21) Appl. No.: 14/159,019

(22) Filed: Jan. 20, 2014

(65) Prior Publication Data

US 2014/0133441 A1 May 15, 2014

Related U.S. Application Data

(63) Continuation of application No. PCT/CN2011/077649, filed on Jul. 27, 2011.

(51) Int. Cl.
*H04W 72/04* (2009.01)
*H04B 7/04* (2006.01)
(Continued)

(52) U.S. Cl.
CPC ....... *H04W 72/0406* (2013.01); *H04B 7/0413* (2013.01); *H04B 7/0452* (2013.01); *H04B 7/0456* (2013.01); *H04B 7/0689* (2013.01); *H04L 5/0053* (2013.01); *H04L 5/0007* (2013.01); *H04L 5/0094* (2013.01); *H04W 72/1289* (2013.01)

(58) Field of Classification Search
None
See application file for complete search history.

(56) References Cited

U.S. PATENT DOCUMENTS

2002/0018530 A1 2/2002 Kim et al.
2010/0080154 A1 4/2010 Noh et al.
(Continued)

FOREIGN PATENT DOCUMENTS

CN 1337838 A 2/2002
CN 1731701 A 2/2006
(Continued)

OTHER PUBLICATIONS

Extended European search report with supplementary European search report and the European search opinion issued by the European Patent Office for corresponding European Patent Application No. 11869850.5, mailed on Apr. 8, 2015.
(Continued)

*Primary Examiner* — Gary Mui
(74) *Attorney, Agent, or Firm* — Myers Wolin, LLC.

(57) ABSTRACT

A method and apparatus for transmitting control signaling includes: transmitting indication information on a transmission location of control signaling by a base station to a mobile station configured as an open-loop MIMO transmission mode; transmitting the control signaling by the base station in a data region by using the open-loop MIMO transmission mode or a transmit diversity transmission mode if the location for transmitting the control signaling indicated by the information on a transmission location of control signaling is located at the data region. Whereby the number of mobile stations to be scheduled in a cell is increased and results in the scheduling information to be transmitted in a subframe increased, the control signaling of a mobile station configured as an open-loop MIMO transmission mode is placed in a data region for transmission, thereby increasing the number of UE scheduled, increasing the throughput of the system.

8 Claims, 4 Drawing Sheets

(51) Int. Cl.
*H04B 7/06* (2006.01)
*H04L 5/00* (2006.01)
*H04W 72/12* (2009.01)

(56) References Cited

U.S. PATENT DOCUMENTS

| | | | | |
|---|---|---|---|---|
| 2010/0111226 A1* | 5/2010 | Ko et al. | ............ | 375/299 |
| 2012/0182950 A1* | 7/2012 | Chung et al. | ............ | 370/329 |
| 2012/0314678 A1* | 12/2012 | Ko et al. | ............ | 370/329 |
| 2014/0029565 A1* | 1/2014 | Kim et al. | ............ | 370/329 |
| 2014/0050130 A1* | 2/2014 | Kim et al. | ............ | 370/280 |

FOREIGN PATENT DOCUMENTS

| | | |
|---|---|---|
| CN | 101505205 | 8/2009 |
| CN | 101873670 A | 10/2010 |
| CN | 102064924 | 5/2011 |
| CN | 102122979 | 7/2011 |
| WO | 2010/101414 | 9/2010 |

OTHER PUBLICATIONS

3GPP TS 36.211 V10.2.0, 3rd Generation Partnership Project; Technical Specification Group Radio Access Network; Evolved Universal Terrestrial Radio Access (E-UTRA); "Physical Channels and Modulation (Release 10)", Jun. 2011.

ZTE, "Aspects on DL control signaling enhancements", Agenda Item: 6.3.2.2, 3GPP TSG-RAN WG1 Meeting #65, R1-111521, Barcelona, Spain, May 9-13, 2011.

Notice of Preliminary Rejection issued by the Korean Intellectual Property Office for corresponding Korean Patent Application No. 10-2014-7001506, mailed on Apr. 20, 2015, with English translation.

Non-Final Rejection issued by the Japan Patent Office for corresponding Japanese Patent Application No. 2014-521898, mailed on Jun. 2, 2015, with an English translation.

Fujitsu, "Further Considerations on CoMP Scenario 4", Agenda Item: 6.3.1.3, 3GPP TSG-RAN WG1 Meeting #65, R1-111723, Barcelona, Spain, May 9-13, 2011.

Nokia et al., "On enhanced downlink control signalling for Rel-11", Agenda Item: 6.3.2.2, 3GPP TSG-RAN WG1 Meeting #65, R1-111743, Barcelona, Spain, May 9-13, 2011.

International search report issued for corresponding international application No. PCT/CN2011/077649, mailed Apr. 26, 2012.

First Notification of Office Action issued by the State Intellectual Property Office of China for corresponding Chinese Patent Application No. 201180069496.2, dated Aug. 5, 2015, with an English translation.

Notice of preliminary rejection issued for corresponding Korean Patent Application No. 10-2016-7002164 mailed on Apr. 5, 2016 with an English translation.

Samsung, "Discussion on Downlink Control Channel Enhancement," Agenda Item: 6.3.2.2; R1-111471, 3GPP TSG-RAN1#65 meeting, Barcelona, Spain, May 9-13, 2011.

* cited by examiner

METHOD AND APPARATUS FOR TRANSMITTING CONTROL SIGNALING

CROSS-REFERENCE TO RELATED APPLICATIONS

This is a continuation of International Application No. PCT/CN2011/077649, filed on Jul. 27, 2011, now pending, the contents of which are herein wholly incorporated by reference.

TECHNICAL FIELD

The present invention relates to the field of communications, and in particular to a method and apparatus for transmitting control signaling.

BACKGROUND

In a long-term evolution (LTE) system, a physical downlink control channel (PDCCH) is used to transmit control information, including downlink scheduling information (DL-grant), uplink scheduling information (UL-grant), and control information, etc. Signaling transmitted in the PDCCH is referred to as downlink control information (DCI). A base station multiplexes PDCCHs of all mobile stations in a cell in former several OFDM symbols of a subframe for transmission, and latter OFDM symbols of the subframe are used for transmission PDSCHs of the mobile stations; wherein, a region transmitting the PDCCHs is referred to as a control region, and a region transmitting the PDSCHs is referred to as a data region. Currently, at most 3 OFDM symbols may be used for transmission of PDCCHs, and a typical subframe structure is shown in FIG. 1.

However, in some scenarios, there would be a case where capacity of the PDCCH is limited, that is, the capacity of 3 OFDM symbols cannot meet the scheduling requirement of current mobile stations. In such a case, for example, in LTE Release 11, there exist multiple radio remote headers (RRHs) in a cell at the same time, so as to provide better services to mobile stations in the area. Typical deployment of a cell containing RRHs is shown in FIG. 2. As the transmission power of an RRH is relatively low and the RRHs are spaced apart by a relatively large distance, mobile stations within the coverage of different RRHs may share the same resources; that is, comparatively speaking, in resources of a subframe, the number of mobile stations that may be scheduled in a cell may be greatly increased. Therefore, the number of pieces of scheduling information needs to be transmitted in a subframe will be correspondingly increased, and conventional 3 OFDM symbols may be insufficient for placement of scheduling information of all the mobile stations. If such a problem cannot be solved, scheduling of UE (user equipment) will be reduced, thereby lowering the throughput of the system.

It should be noted that the above description of the background art is merely provided for clear and complete explanation of the present invention and for easy understanding by those skilled in the art. And it should not be understood that the above technical solution is known to those skilled in the art as it is described in the background art of the present invention.

SUMMARY

A method and apparatus for transmitting control signaling are provided in the embodiments of the present invention, so as to solve the problem that the capacity of the PDCCH is limited by placing the control signaling of a mobile station configured as an open-loop MIMO transmission mode in a data region for transmission.

According to one aspect of the embodiments of the present invention, there is provided a method for transmitting control signaling, and the method includes:

transmitting indication information on a transmission location of control signaling by a base station to a mobile station configured as an open-loop MIMO transmission mode; and transmitting the control signaling by the base station in a data region by using an open-loop MIMO transmission mode or a transmit diversity transmission mode if the location for transmitting the control signaling indicated by the indication information on a transmission location of control signaling is located at the data region.

According to another aspect of the embodiments of the present invention, there is provided a base station, including:

a first transmitting unit configured to transmit indication information on a transmission location of control signaling to a mobile station configured as an open-loop MIMO transmission mode; and a second transmitting unit configured to transmit the control signaling in a data region by using an open-loop MIMO transmission mode or a transmit diversity transmission mode if the location for transmitting the control signaling indicated by the indication information on a transmission location of control signaling is located at the data region.

According to still another aspect of the embodiments of the present invention, there is provided a computer-readable program, wherein when the program is executed in a base station, the program enables a computer to carry out the method for transmitting control signaling as described above in the base station.

According to still another aspect of the embodiments of the present invention, there is provided a storage medium in which a computer-readable program is stored, wherein the computer-readable program enables a computer to carry out the method for transmitting control signaling as described above in a base station.

The advantage of the embodiments of the present invention resides in that in a case where the number of mobile stations that need to be scheduled in a cell is increased and it is resulted in that the scheduling information needing to be transmitted in a subframe is increased, the control signaling of a mobile station configured as an open-loop MIMO transmission mode is placed in a data region for transmission according to the method and apparatus of the embodiments of the present invention, thereby increasing the number of UE the can be scheduled, increasing the throughput of the system, and solving the problem that the capacity of the PDCCH is limited.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated or reduced in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment. In the drawings.

DETAILED DESCRIPTION

Foregoing and other features of the embodiments of the present invention will become apparent with reference to the drawings and the following description. These embodiments are illustrative only and are not intended to limit the present invention. For easy understanding of the principle and embodiments of the present invention by those skilled in the art, the embodiments of the present invention shall be described taking a method for transmitting control signaling in an LTE/LTE-A system as an example. However, it should be appreciated that the embodiments of the present invention are not limited to said system, and are applicable to any system relating to transmission of control signaling.

An embodiment of the present invention provides a method for transmitting control signaling, as described in Embodiment 1 below.

Embodiment 1

Figure 3:
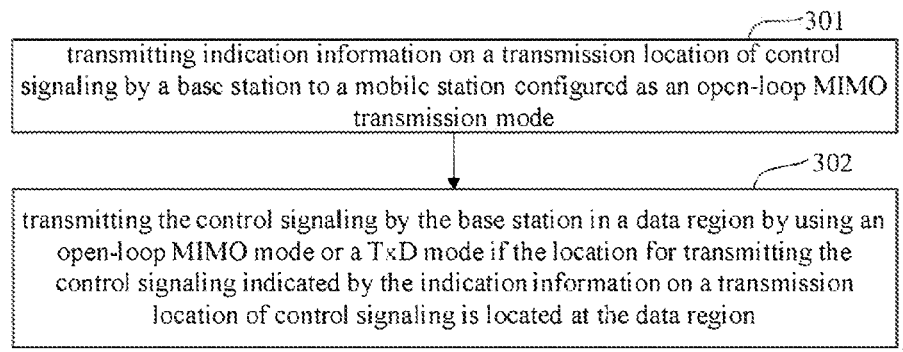
FIG. 3 is a flowchart of the method for transmitting control signaling provided by Embodiment 1 of the present invention.

FIG. 3 is a flowchart of the method for transmitting control signaling provided by Embodiment 1 of the present invention. Referring to FIG. 3, the method includes:

step 301: transmitting indication information on a transmission location of control signaling by a base station to a mobile station configured as an open-loop MIMO transmission mode;

wherein, the indication information on a transmission location of control signaling is used to indicate a transmission location of the control signaling, the transmission location here being in a control region, i.e. a conventional PDCCH region, or being in a data region, i.e. a conventional PDSCH region;

step 302: transmitting the control signaling by the base station in a data region by using an open-loop MIMO (Multiple Input Multiple Output) mode or a transmit diversity (TxD) mode if the location for transmitting the control signaling indicated by the indication information on a transmission location of control signaling is located at the data region.

For a mobile station configured as an open-loop MIMO transmission mode, this embodiment provides a method for transmitting control signaling; wherein the region for transmitting control signaling is changed from a conventional PDCCH region into a data region, and the transmission mode may be an MIMO transmission mode, or may be a TxD transmission mode.

Figure 4:
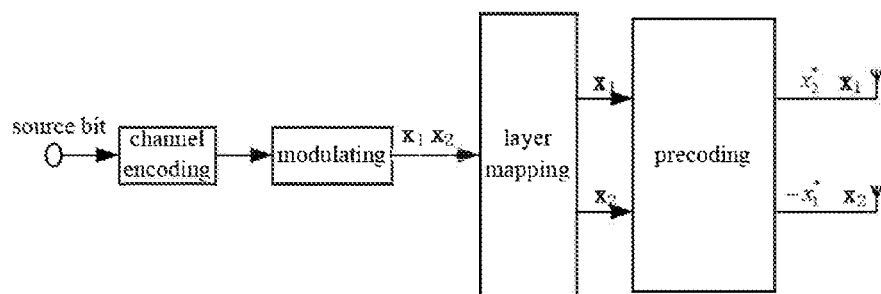
FIG. 4 is a processing flowchart of transmitting control signaling in a data region in a TxD manner.

If the control signaling is transmitted in the data region in the TxD transmission mode, the procedure of transmission of the control signaling is the same as that in the TxD transmission mode in an existing standard. Taking that 2 antennas are used at a transmission end as an example, a procedure of processing is as shown in FIG. 4. The transmission end uses only a link of modulation and coding, that is, there exists correspondingly one codeword only. Source bit information, such as the control signaling in this embodiment, is channel encoded and symbol modulated, and the generated symbols are layer mapped, with the layer number of the layer mapped being referred to as a rank, which is 2 in FIG. 4; and the layer mapped data are precoded, and the generated symbol sequence is mapped onto allocated resource elements, and is finally transmitted via antennas, wherein, input symbol of the precoding is vector $$\begin{bmatrix} x_1 \\ x_2 \end{bmatrix},$$

and output symbol of the precoding is matrix $$\begin{bmatrix} x_1 & x_2^* \\ x_2 & -x_1^* \end{bmatrix}.$$

If the control signaling is transmitted in the data region in an open loop MIMO transmission mode, the modulation and coding scheme of the control signaling is the same as that in the open loop MIMO transmission mode in an existing standard, but the layer mapping and precoding scheme of the control signaling are different from the layer mapping and precoding scheme in an existing standard. For clarity and easy understanding of the method for transmitting control signaling in the data region in the open loop MIMO transmission mode of this embodiment, transmission of data in a data region in an open loop MIMO transmission mode in an existing standard and transmission of control signaling in a data region in an open loop MIMO transmission mode in an embodiment of the present invention shall be described in detail in a comparative manner.

Figure 5:
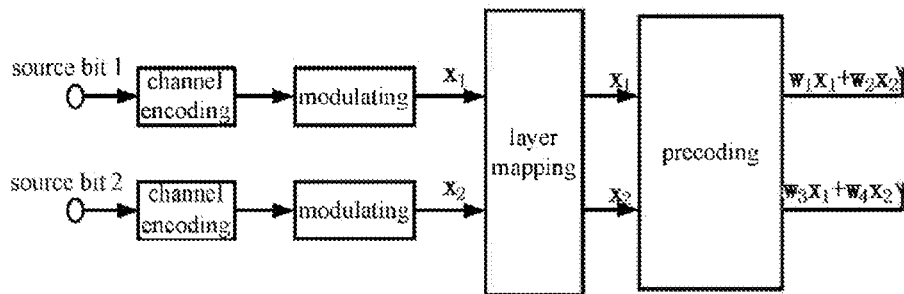
FIG. 5 is a processing flowchart of a transmission end in a closed loop/open loop MIMO transmission mode in an existing standard.

FIG. 5 is a processing flowchart of transmission of data in a data region in a closed loop/open loop MIMO transmission mode in an existing standard. Referring to FIG. 5, there are mainly two types of transmission modes of a base station configured as an MIMO transmission mode, one is open loop MIMO transmission mode, and the other is closed loop MIMO transmission mode, wherein, the open loop MIMO transmission mode is mainly configured for a mobile station of a relatively high moving speed, a precoding matrix adopted by a base station needs not to be fed back by a mobile station, and the precoding matrix is designated by the base station following a certain rule; and the closed loop MIMO transmission mode is configured for a mobile station of a relatively low moving speed, and a precoding matrix adopted by a base station is obtained according to a precoding matrix index fed back by a mobile station and a predefined codebook.

Figure 1:
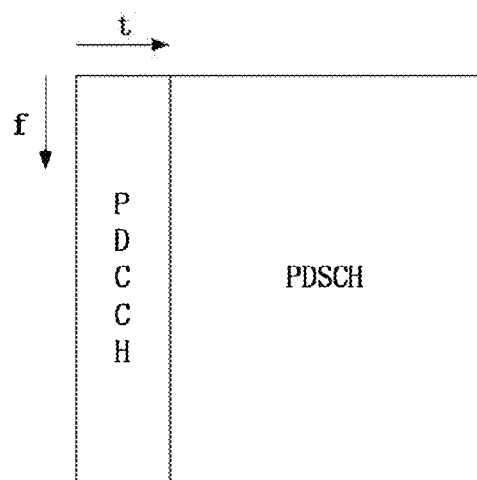
FIG. 1 is a schematic diagram of the typical structure of a subframe.
Figure 2:
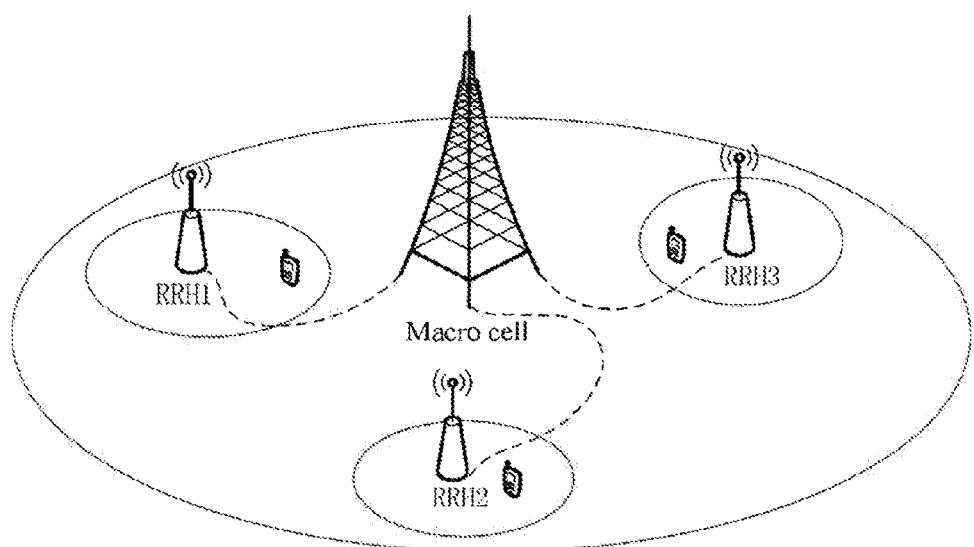
FIG. 2 is a schematic diagram of the network structure of a cell containing RRHs.

In an existing standard, transmission end models in an open loop MIMO transmission mode and a closed loop MIMO transmission mode are analogous. Taking a transmission mode in which two antennas are used and the rank is 2 as an example, a procedure of transmission of the transmission end is as shown in FIG. 2. It can be seen from comparison of FIGS. 4 and 5 that a difference between the open/closed loop MIMO transmission mode and the TxD transmission mode resides in that the link numbers of modulation and coding of the transmission ends are different when they are configured with a rank of greater than or equal to 2. For the TxD transmission mode, the link number of the modulation and coding of the transmission end is 1, and for the open/closed loop MIMO transmission mode, the link number of the modulation and coding of the transmission end is 2 when the rank is greater than or equal to 2.

Figure 6:
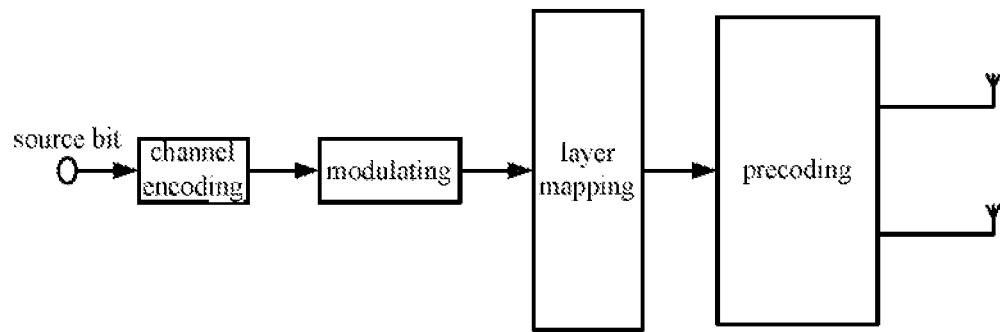
FIG. 6 is a processing flowchart of a transmission end in which open loop MIMO adopts a rank of 1 in a future LTE system.

In an existing standard, if a mobile station configured as an open loop MIMO transmission mode really adopts the open loop MIMO transmission mode, the minimum rank is 2, and the minimum rank that may be adopted in the closed loop MIMO transmission mode is 1. And for a mobile station in an open loop MIMO transmission mode, if the requirement of a current channel cannot be met when the rank is 2, it may return back to the TxD transmission mode. Furthermore, in a future LTE system, the loop MIMO transmission mode may possibly support a mode in which the rank is 1, and in this case a model of the transmission end is shown in FIG. 6.

Figure 7:
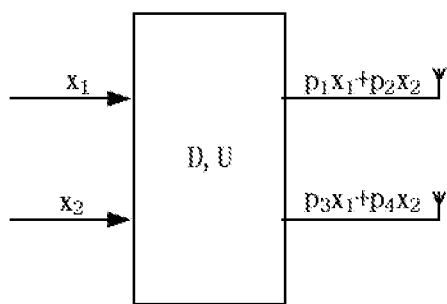
FIG. 7 is a flowchart of precoding processing in an open loop MIMO transmission mode in an existing standard.

In an existing standard, the transmission end in the open loop MIMO transmission mode may be expressed as y=W× D×U×x, that is, the precoding matrix includes three parts: matrix W, matrix D and matrix U. Taking that two antennas are used and the rank is 2 as an example, a process that transmission signals pass through the matrix D and the matrix U is shown in FIG. 7. It can be seen that before passing through the matrix W, each symbol in each layer includes signals from codeword 1 and codeword 2, that is, an effect of diversity is achieved. If there exists no such an effect of diversity, that is, the transmission signals pass through the matrix W directly but not pass through matrices D and U, an adverse effect will be brought to the decoding of a codeword mapped onto a layer when a channel state in this layer suddenly deteriorates. In an existing standard, a precoding matrix in the closed loop MIMO transmission mode includes only one matrix W'.

Figure 8:
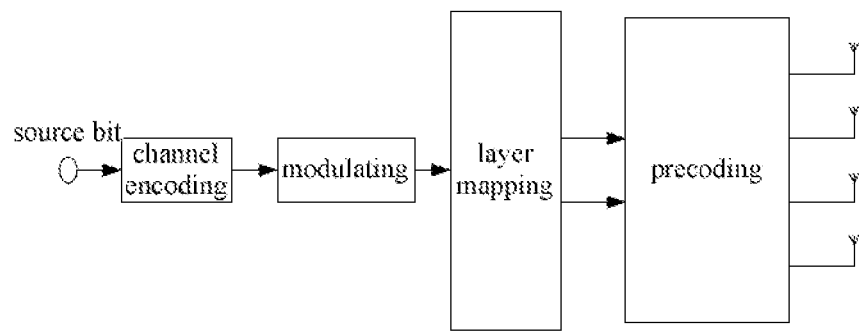
FIG. 8 is a processing flowchart of a transmission end transmitting control signaling in a data region in an open loop MIMO transmission mode in an embodiment of the present invention.

FIG. 8 is a processing flowchart of transmitting control signaling in a data region in an open loop MIMO transmission mode in an embodiment of the present invention. Referring to FIG. 8, this embodiment is described taking that the rank is 2 and four antennas are used as an example.

In an embodiment, when a base station transmits control signaling in a data region in an open loop MIMO transmission mode, the rank used by the base station in transmitting the control signaling may be the minimum rank in the supportable open loop MIMO transmission mode. That is, if the supportable open loop MIMO transmission mode is an open loop MIMO transmission mode in an existing standard, the rank in transmitting the control signaling in this embodiment is 2; and if the supportable open loop MIMO transmission mode is a newly-defined open loop MIMO transmission mode and the new mode supports that the rank is 1, the rank in transmitting the control signaling in this embodiment is 1.

In another embodiment, when a base station transmits control signaling in a data region in an open loop MIMO transmission mode, the rank used by the base station in transmitting the control signaling may also be the rank configure by the base station for the transmission of data. That is, a value of the rank used by the control signaling in this embodiment may be equal to that of the rank configured by the base station for the data. For example, if the rank configured by the base station for the data is 2, the rank used by the control signaling in this embodiment is 2; if the rank configured by the base station for the data is 3, the rank used by the control signaling in this embodiment is 3; and if the rank configured by the base station for the data is 4, the rank used by the control signaling in this embodiment is 4, and so on.

In this embodiment, when the rank used by the base station in transmitting the control signaling in the data region is greater than or equal to 2, different from an existing standard (i.e. as shown in FIG. 5), the base station adopts one modulation and coding link to transmit the control signaling. Referring to FIG. 8, first, channel coding is performed to the control signaling; then the symbols that are channel encoded are modulated; thereafter, layer mapping is performed to the modulated symbols according to the rank; and finally, the data that are layer mapped are precoded by using a unitary precoding matrix.

As shown in FIG. 8, in this embodiment, a unitary precoding matrix W is only used in the processing of precoding, excluding matrices D and U. This is because that one codeword is only used and corresponding modulation signals are allocated onto two layers, and an effect of diversity is achieved.

In this embodiment, if the mobile station is configured as an open loop MIMO transmission mode and the demodulation of data by it is configured as performing channel estimation based on a specific reference signal, the control signaling transmitted together with data in the same subframe in the data region is also performed channel estimation based on a specific reference signal, and then is demodulated.

In this embodiment, as the data are transmitted in an open loop MIMO transmission mode, as described above, on the basis of channel requirements, the open loop MIMO transmission mode of the data may return back to the TxD transmission mode. Hence, according to the method of this embodiment, when it is found that the open loop MIMO transmission mode of the data returns back to the TxD transmission mode, the transmission mode of the control signaling also returns back to the TxD transmission mode. Further more, when the base station transmits the control signaling in the data region in an open loop MIMO transmission mode, whether the base station returns back to transmitting data in a TxD transmission mode may be judged in this embodiment, and if the base station returns back to transmitting data in a TxD transmission mode, the base station also returns back to transmitting the control signaling in a TxD transmission mode.

With the method of this embodiment, in a case where the number of mobile stations that need to be scheduled in a cell is increased and it is resulted in that the scheduling information needing to be transmitted in a subframe is increased, the control signaling of a mobile station configured as an open-loop MIMO transmission mode is placed in a data region for transmission, thereby increasing the number of UE the can be scheduled, increasing the throughput of the system, and solving the problem that the capacity of the PDCCH is limited.

An embodiment of the present invention further provides a base station, as described in Embodiment 2 below. As the principle of the base station for solving problems is similar to that of the method for transmitting control signaling based on a base station in the above-described Embodiment 1, the implementation of the method may be referred to for the implementation of the base station, and the repeated parts shall not be described any further.

Embodiment 2

Figure 9:
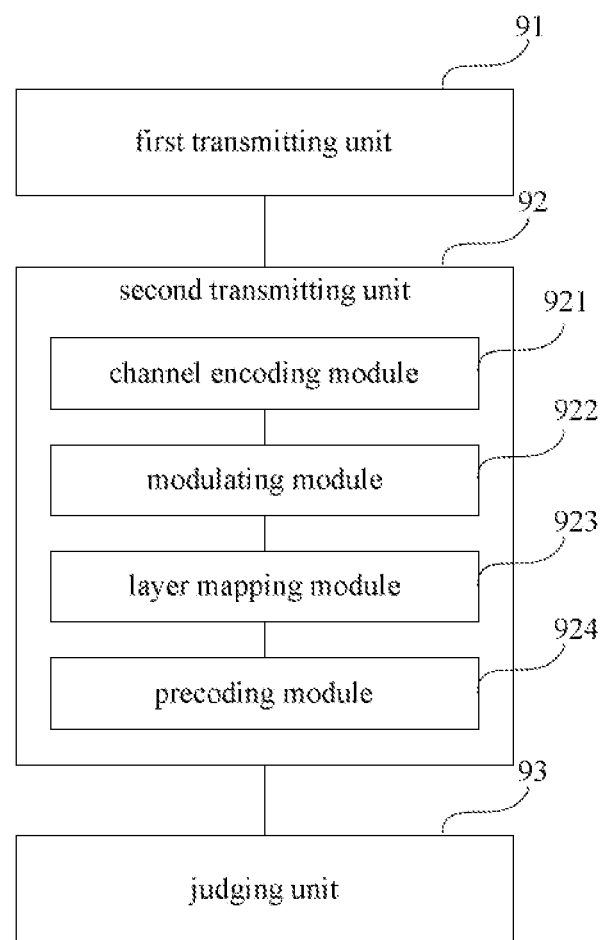
FIG. 9 is a schematic diagram of the structure of the base station provided by Embodiment 2 of the present invention.

FIG. 9 is a schematic diagram of the structure of a base station provided by an embodiment of the present invention. As shown in FIG. 9, the base station includes:

a first transmitting unit 91 configured to transmit indication information on a transmission location of control signaling to a mobile station configured as an open-loop MIMO transmission mode; and a second transmitting unit 92 configured to transmit the control signaling in a data region by using an open-loop MIMO transmission mode or a transmit diversity transmission mode if the location for transmitting the control signaling indicated by the indication information on a transmission location of control signaling is located at the data region.

It can be seen from Embodiment 1 that the base station of this embodiment provides a method for transmitting control signaling for a mobile station configured as an open loop MIMO transmission mode, wherein the region for transmitting control signaling is changed from a conventional PDCCH region into a data region, and the transmission mode may be an open loop MIMO transmission mode, or may be a TxD transmission mode. Hence, the problem that the capacity of the PDCCH is limited for a mobile station configured as an open loop MIMO transmission mode is solved.

In an embodiment, when the second transmitting unit 92 transmits the control signaling in the data region by using an open-loop MIMO transmission mode, the rank adopted by the second transmitting unit 92 in transmission of the control signaling is the minimum rank of the supportable open-loop MIMO transmission mode.

In another embodiment, when the second transmitting unit 92 transmits the control signaling in the data region by using an open-loop MIMO transmission mode, the rank adopted by the second transmitting unit 92 in transmission of the control signaling is the rank configured by the base station in transmission of data;

wherein, if the rank adopted by the second transmitting unit 92 in transmission of the control signaling is greater than or equal to 2, the second transmitting unit 92 transmits the control signaling via one modulation encoding link; and wherein, the second transmitting unit 92 includes:

a channel encoding module 921 configured to perform channel encoding on the control signaling;

a modulating module 922 configured to perform modulation on channel encoded symbols;

a layer mapping module 923 configured to perform layer mapping on the modulated symbols according to the rank; and a precoding module 924 configured to precode the layer mapped data by using a unitary precoding matrix.

In this embodiment, the control signaling transmitted by the second transmitting unit 92 in the data region uses a dedicated reference signal to perform channel estimation, so as to facilitate demodulation.

In this embodiment, when the base station transmits the control signaling in the data region by using an open-loop MIMO transmission mode, the base station further includes:

a judging unit 93 configured to judge whether the base station returns to transmitting data by using a transmit diversity transmission mode;

and the second transmitting unit 92 returns back to transmitting the control signaling by using a transmit diversity transmission mode if the result of judgment of the judging unit 93 is positive.

With the base station of this embodiment, in a case where the number of mobile stations that need to be scheduled in a cell is increased and it is resulted in that the scheduling information needing to be transmitted in a subframe is increased, the base station places the control signaling of a mobile station configured as an open-loop MIMO transmission mode in a data region for transmission, thereby increasing the number of UE the can be scheduled, increasing the throughput of the system, and solving the problem that the capacity of the PDCCH is limited.

An embodiment of the present invention further provides a computer-readable program, wherein when the program is executed in a base station, the program enables a computer to carry out the method for transmitting control signaling as described in Embodiment 1 in the base station.

An embodiment of the present invention further provides a storage medium in which a computer-readable program is stored, wherein the computer-readable program enables a computer to carry out the method for transmitting control signaling as described in Embodiment 1 in a base station.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications

The invention claimed is:

1. A method for transmitting control signaling, the method comprising:
   transmitting indication information on a transmission location of control signaling by a base station to a mobile station; and
   transmitting the control signaling by the base station in a data region by using a preconfigured open-loop MIMO transmission mode or a transmit diversity transmission mode if the location for transmitting the control signaling indicated by the indication information on a transmission location of control signaling is located at the data region and if the mobile station is configured as an open-loop MIMO transmission mode;
   when the base station transmits the control signaling in the data region by using the preconfigured open-loop MIMO transmission mode, a rank adopted by the base station in transmission of the control signaling is a minimum rank of a supportable open-loop MIMO transmission mode,
   wherein the control signaling transmitted in the data region uses a dedicated reference signal to perform channel estimation.

2. The method according to claim 1, wherein if the rank adopted by the base station in transmission of the control signaling is greater than or equal to 2, the base station transmits the control signaling via one modulation encoding link.

3. The method according to claim 2, wherein the base station transmitting the control signaling via one modulation encoding link comprises:
   performing channel encoding on the control signaling;
   performing modulation on channel encoded symbols;
   performing layer mapping on the modulated symbols according to the rank; and
   precoding the layer mapped modulated symbols by using a unitary precoding matrix.

4. The method according to claim 1, wherein when the base station transmits the control signaling in the data region by using the open-loop MIMO transmission mode, the method further comprises:
   judging whether the base station returns to transmitting data by using a transmit diversity transmission mode; and
   returning by the base station to transmitting the control signaling by using a transmit diversity transmission mode if the base station returns to transmitting data by using a transmit diversity transmission mode.

5. A base station, comprising:
   a first transmitting unit to transmit indication information on a transmission location of control signaling to a mobile station; and
   a second transmitting unit to transmit the control signaling in a data region by using a preconfigured open-loop MIMO transmission mode or a transmit diversity transmission mode if the location for transmitting the control signaling indicated by the indication information on a transmission location of control signaling is located at the data region and if the mobile station is configured as an open-loop MIMO transmission mode;
   wherein when the second transmitting unit transmits the control signaling in the data region by using the preconfigured open-loop MIMO transmission mode, a rank adopted by the second transmitting unit in transmission of the control signaling is a minimum rank of a supportable open-loop MIMO transmission mode,
   wherein the control signaling transmitted in the data region uses a dedicated reference signal to perform channel estimation.

6. The base station according to claim 5, wherein if the rank adopted by the second transmitting unit in transmission of the control signaling is greater than or equal to 2, the second transmitting unit transmits the control signaling via one modulation encoding link.

7. The base station according to claim 6, wherein the second transmitting unit comprises:
   a channel encoding module to perform channel encoding on the control signaling;
   a modulating module to perform modulation on channel encoded symbols;
   a layer mapping module to perform layer mapping on the modulated symbols according to the rank; and
   a precoding module to precode the layer mapped modulated symbols by using a unitary precoding matrix.

8. The base station according to claim 5, wherein when the base station transmits the control signaling in the data region by using the open-loop MIMO transmission mode, the base station further comprises:
   a judging unit to judge whether the base station returns to transmitting data by using a transmit diversity transmission mode; and
   returning by the second transmitting unit to transmitting the control signaling by using a transmit diversity transmission mode if a result of judgment of the judging unit is positive.

* * * * *